(12) United States Patent
Anderson (10) Patent No.: US 8,321,061 B2
(45) Date of Patent: Nov. 27, 2012

(54) SYSTEM AND METHOD FOR IRRIGATION USING ATMOSPHERIC WATER

(75) Inventor: Noel Wayne Anderson, Fargo, ND (US)

(73) Assignee: Deere & Company, Moline, IL (US)

(*) Notice: Subject to any disclaimer, the term of this patent is extended or adjusted under 35 U.S.C. 154(b) by 315 days.

(21) Appl. No.: 12/817,638

(22) Filed: Jun. 17, 2010

(65) Prior Publication Data

US 2011/0313577 A1    Dec. 22, 2011

(51) Int. Cl.
- *G06F 19/00* (2011.01)
- *A01G 27/00* (2006.01)
- *A01G 25/16* (2006.01)
- *F25D 21/14* (2006.01)

(52) U.S. Cl. ............. 700/284; 62/115; 62/126; 62/285; 62/291

(58) Field of Classification Search .......... 700/284; 62/115, 126, 285, 291
See application file for complete search history.

(56) References Cited

U.S. PATENT DOCUMENTS

| | | | |
|---|---|---|---|
| 3,674,652 A * | 7/1972 | Brown | 203/11 |
| 3,931,413 A | 1/1976 | Frick et al. | |
| 4,067,714 A | 1/1978 | Willard, Sr. | |
| 4,083,494 A | 4/1978 | Ballu | |
| 4,146,383 A | 3/1979 | Hanway et al. | |
| 4,150,970 A | 4/1979 | Ries et al. | |
| 4,175,394 A | 11/1979 | Wiesboeck | |
| 4,286,530 A | 9/1981 | Conley | |
| 4,315,599 A | 2/1982 | Biancardi | |
| 4,342,176 A | 8/1982 | Wolfe | |
| 4,358,054 A | 11/1982 | Ehrat | |
| 4,385,500 A | 5/1983 | Kjelgaard et al. | |
| 4,398,384 A | 8/1983 | Klinner | |
| 4,433,552 A * | 2/1984 | Smith | 62/93 |
| 4,516,723 A | 5/1985 | Hesse | |
| 4,588,127 A | 5/1986 | Ehrat | |

(Continued)

FOREIGN PATENT DOCUMENTS

DE    3830647    3/1990

(Continued)

OTHER PUBLICATIONS

"Dew water collector for potable water in Ajaccio", Muselli et al, Atmospheric Research 64 (2002).*

(Continued)

*Primary Examiner* — Michael D Masinick
(74) *Attorney, Agent, or Firm* — Yee & Associates, P.C.; Anand Gupta (57) ABSTRACT

An embodiment of the invention delivers water to plants of a specified type which reside in a quantity of soil. A condensing unit is operated at optimum intervals to condense water vapor in the air into water in liquid form. The condensed water is stored in a reservoir connected to an irrigation system, which can deliver water from the reservoir to each of the plants. A database is established that contains horticultural information, wherein the horticultural information comprises a set of values representing the water needed by plants of the specified type at different stages of growth. Estimates of soil moisture content are generated during a specified time period. Optimum watering intervals are computed during the specified time period, at least in part, as a function of the set of values contained in the horticultural database, and also as a function of the estimates of moisture content. The irrigation system is operated to deliver water to each plant during respective optimum watering intervals.

21 Claims, 5 Drawing Sheets

U.S. PATENT DOCUMENTS

| | | | |
|---|---|---|---|
| 4,610,122 A | 9/1986 | De Clercq | |
| 4,638,594 A | 1/1987 | Hughet et al. | |
| 4,704,986 A | 11/1987 | Remp et al. | |
| 4,757,688 A | 7/1988 | Basiulis et al. | |
| 4,832,263 A | 5/1989 | Poynor | |
| 4,871,447 A | 10/1989 | Adamache | |
| 4,903,903 A | 2/1990 | Benen | |
| 4,949,656 A | 8/1990 | Lyle et al. | |
| 4,970,973 A | 11/1990 | Lyle et al. | |
| 4,982,898 A | 1/1991 | Ballu | |
| 4,992,942 A | 2/1991 | Bauerle et al. | |
| 5,076,497 A | 12/1991 | Rabitsch | |
| 5,092,422 A | 3/1992 | Hood et al. | |
| 5,140,917 A | 8/1992 | Swanson | |
| 5,248,090 A | 9/1993 | Williamson | |
| 5,255,857 A | 10/1993 | Hunt | |
| 5,355,815 A | 10/1994 | Monson | |
| 5,442,552 A | 8/1995 | Slaughter et al. | |
| 5,601,236 A | 2/1997 | Wold | |
| 5,740,038 A | 4/1998 | Hergert | |
| 5,840,102 A | 11/1998 | McCracken | |
| 5,870,302 A | 2/1999 | Oliver | |
| 5,884,224 A | 3/1999 | McNabb et al. | |
| 5,902,343 A | 5/1999 | Hale et al. | |
| 5,907,925 A | 6/1999 | Guyot | |
| 5,913,915 A | 6/1999 | McQuinn | |
| 5,915,313 A | 6/1999 | Bender et al. | |
| 5,919,242 A | 7/1999 | Greatline et al. | |
| 5,924,371 A | 7/1999 | Flamme et al. | |
| 5,927,603 A | 7/1999 | McNabb et al. | |
| 5,979,703 A | 11/1999 | Nystrom | |
| 5,991,687 A | 11/1999 | Hale et al. | |
| 5,995,895 A | 11/1999 | Watt et al. | |
| 6,039,212 A | 3/2000 | Singh | |
| 6,079,340 A | 6/2000 | Flamme et al. | |
| 6,089,743 A | 7/2000 | McQuinn | |
| 6,116,519 A | 9/2000 | Williamson | |
| 6,122,581 A | 9/2000 | McQuinn | |
| 6,129,520 A | 10/2000 | Cooper | |
| 6,141,614 A | 10/2000 | Janzen et al. | |
| 6,178,253 B1 | 1/2001 | Hendrickson et al. | |
| 6,199,000 B1 | 3/2001 | Keller et al. | |
| 6,230,091 B1 | 5/2001 | McQuinn | |
| 6,337,971 B1 | 1/2002 | Abts | |
| 6,443,365 B1 | 9/2002 | Tucker et al. | |
| 6,510,367 B1 | 1/2003 | McQuinn | |
| 6,516,271 B2 | 2/2003 | Upadhyaya et al. | |
| 6,549,851 B2 | 4/2003 | Greensides | |
| 6,553,299 B1 | 4/2003 | Keller et al. | |
| 6,574,979 B2 * | 6/2003 | Faqih | 62/285 |
| 6,596,996 B1 | 7/2003 | Stone et al. | |
| 6,597,991 B1 | 7/2003 | Meron et al. | |
| 6,616,374 B2 | 9/2003 | Starr | |
| 6,666,384 B2 | 12/2003 | Prandi | |
| 6,671,698 B2 | 12/2003 | Pickett et al. | |
| 6,684,648 B2 * | 2/2004 | Faqih | 62/93 |
| 6,691,135 B2 | 2/2004 | Pickett et al. | |
| 6,755,362 B2 | 6/2004 | Krieger et al. | |
| 6,778,887 B2 | 8/2004 | Britton | |
| 6,792,395 B2 | 9/2004 | Roberts | |
| 6,802,153 B2 | 10/2004 | DuBois et al. | |
| 6,854,209 B2 | 2/2005 | Van Horssen et al. | |
| 6,862,083 B1 | 3/2005 | McConnell et al. | |
| 6,877,325 B1 | 4/2005 | Lawless | |
| 6,907,319 B2 | 6/2005 | Hoelscher et al. | |
| 6,928,339 B2 | 8/2005 | Barker | |
| 6,941,225 B2 | 9/2005 | Upadhyaya et al. | |
| 6,963,881 B2 | 11/2005 | Pickett et al. | |
| 6,975,245 B1 | 12/2005 | Slater et al. | |
| 6,978,794 B2 | 12/2005 | Dukes et al. | |
| 7,063,276 B2 | 6/2006 | Newton | |
| 7,069,692 B2 | 7/2006 | Kuiper et al. | |
| 7,089,763 B2 * | 8/2006 | Forsberg et al. | 62/635 |
| 7,171,912 B2 | 2/2007 | Fraisse et al. | |
| 7,182,274 B2 | 2/2007 | Nies | |
| 7,182,445 B2 | 2/2007 | Johnson et al. | |
| 7,275,042 B1 | 9/2007 | Kelly et al. | |
| 7,280,892 B2 | 10/2007 | Bavel | |
| 7,317,972 B2 | 1/2008 | Addink et al. | |
| 7,343,262 B2 | 3/2008 | Baumgarten | |
| 7,408,145 B2 | 8/2008 | Holland | |
| 7,455,245 B2 | 11/2008 | Sipinski et al. | |
| 7,469,707 B2 | 12/2008 | Anderson et al. | |
| 7,565,139 B2 | 7/2009 | Neven, Sr. et al. | |
| 7,577,105 B2 | 8/2009 | Takeyoshi et al. | |
| 7,610,122 B2 | 10/2009 | Anderson | |
| 7,617,992 B2 | 11/2009 | Ivans | |
| 7,686,499 B2 | 3/2010 | Dykstra et al. | |
| 7,775,168 B2 | 8/2010 | Sidhwa et al. | |
| 7,805,221 B2 | 9/2010 | Nickerson | |
| 7,809,475 B2 | 10/2010 | Kaprielian | |
| 7,844,368 B2 | 11/2010 | Alexanian | |
| 7,854,108 B2 | 12/2010 | Koselka et al. | |
| 7,930,085 B2 | 4/2011 | Anderson et al. | |
| 7,957,850 B2 | 6/2011 | Anderson | |
| 8,028,470 B2 | 10/2011 | Anderson | |
| 8,150,554 B2 | 4/2012 | Anderson | |
| 8,170,405 B2 | 5/2012 | Harris | |
| 2002/0011075 A1 * | 1/2002 | Faqih | 62/285 |
| 2002/0170229 A1 | 11/2002 | Ton et al. | |
| 2003/0019408 A1 | 1/2003 | Fraisse et al. | |
| 2003/0215354 A1 | 11/2003 | Clark et al. | |
| 2003/0229434 A1 | 12/2003 | Miedema | |
| 2004/0034459 A1 | 2/2004 | Hoelscher et al. | |
| 2004/0078092 A1 | 4/2004 | Addink et al. | |
| 2004/0231240 A1 | 11/2004 | Kuiper et al. | |
| 2005/0129034 A1 | 6/2005 | Takeyoshi et al. | |
| 2005/0187665 A1 | 8/2005 | Fu | |
| 2005/0199842 A1 | 9/2005 | Parsons et al. | |
| 2006/0026556 A1 | 2/2006 | Nishimura | |
| 2006/0089260 A1 | 4/2006 | Di et al. | |
| 2007/0042803 A1 | 2/2007 | Anderson | |
| 2007/0220808 A1 | 9/2007 | Kaprielian et al. | |
| 2008/0061163 A1 | 3/2008 | Kubby et al. | |
| 2008/0097653 A1 | 4/2008 | Kaprielian et al. | |
| 2008/0190020 A1 * | 8/2008 | Todd | 47/48.5 |
| 2008/0288116 A1 | 11/2008 | Nickerson | |
| 2009/0001193 A1 | 1/2009 | Parsons et al. | |
| 2009/0019826 A1 | 1/2009 | Rigney | |
| 2009/0179165 A1 | 7/2009 | Parsons et al. | |
| 2009/0241580 A1 * | 10/2009 | Hill et al. | 62/291 |
| 2009/0259483 A1 | 10/2009 | Hendrickson et al. | |
| 2009/0281672 A1 * | 11/2009 | Pourzia | 700/284 |
| 2009/0314862 A1 | 12/2009 | Bauman et al. | |
| 2010/0032493 A1 | 2/2010 | Abts | |
| 2010/0032495 A1 | 2/2010 | Abts | |
| 2010/0034466 A1 | 2/2010 | Jing et al. | |
| 2010/0109946 A1 | 5/2010 | Pande | |
| 2010/0243754 A1 | 9/2010 | Harris | |
| 2010/0263275 A1 | 10/2010 | Anderson | |
| 2010/0268390 A1 | 10/2010 | Anderson | |
| 2010/0268391 A1 | 10/2010 | Anderson | |
| 2010/0268562 A1 | 10/2010 | Anderson | |
| 2010/0268679 A1 * | 10/2010 | Anderson | 706/46 |
| 2010/0313799 A1 | 12/2010 | Sidhwa et al. | |
| 2010/0332475 A1 | 12/2010 | Birdwell et al. | |
| 2011/0089260 A1 | 4/2011 | Van Roemburg | |
| 2011/0301755 A1 | 12/2011 | Anderson | |
| 2011/0313577 A1 | 12/2011 | Anderson | |
| 2012/0042563 A1 | 2/2012 | Anderson | |
| 2012/0046790 A1 | 2/2012 | Anderson | |
| 2012/0046837 A1 | 2/2012 | Anderson | |
| 2012/0150355 A1 | 6/2012 | Anderson | |

FOREIGN PATENT DOCUMENTS

| | | |
|---|---|---|
| DE | 4413739 A1 | 10/1995 |
| DE | 10002880 C1 | 6/2001 |
| DE | 10148747 A1 | 4/2003 |
| DE | 10221948 A1 | 11/2003 |
| EP | 2243353 | 10/2010 |
| EP | 2423860 A2 | 2/2012 |
| EP | 2426628 A2 | 3/2012 |
| GB | 1597988 | 9/1981 |
| GB | 1603661 | 11/1981 |
| GB | 2462720 A | 2/2010 |

| | | |
|---|---|---|
| WO | 0232222 A1 | 4/2002 |
| WO | 2006060854 A1 | 6/2006 |
| WO | 2009059373 A1 | 5/2009 |

OTHER PUBLICATIONS

Gwatipedza et al., "A General Monopolistic Competition Economic Model of Horticultural Industry with a Risk of Invasion," U.S. Department of Agriculture, Dec. 6, 2007, 27 pages.

European Office Action regarding European Application No. 10 160 613.5-2313, dated Mar. 29, 2012, 4 pages.

"The AW-5000-MC", retrieved Feb. 12, 2010 http://www.airwatercorp.com/.

Romero, "Risk Programming for Agricultural Resource Allocation—A Multidimensional Risk Approach," 2000, pp. 57-68, JC Baltzer AG Science Publishers, Annals of Operations Research 94.

Hardaker, et al., "Assessment of the output of the stochastic decision model," Dec. 1973, pp. 170-178, Australian Journal of Agricultural Economics, vol. 17, No. 3.

Fynn, "A Decision model for resource management using rule-based utility functions and parameter selection," 1988, pp. 1-209, A Dissertation, The Ohio State University.

Prasad, et al., "A Study on Various Expert Systems in Agriculture," 2006, pp. 81-86, Georgian Electronic Scientific Journal, No. 4 (11).

Munoz, et al., "Automatic Irrigation Based on Soil Moisture for Vegetable Crops," 2006, University of Florida, IFAS Extension (7 pages).

EP Search report for application 10160618.4-2313 dated Jul. 26, 2010.

EP Search report for application 10160613.5-2313 dated Jul. 26, 2010.

Perret J S et al: "Development of a Humidification-Dehumidification System in a Quonset Greenhouse for Sustainable Crop Production in Arid Regions", Biosystems Engineering, Academic Press, UK, vol. 91, No. 3 Jul. 1, 2005.

European Search Report, Oct. 25, 2011, 4 pages.

"Google Goggles (Labs): Overview," http://google.com/support/mobile/.../answer.p..., Jun. 1, 2010, 2 pages.

Chesmore, "The Automated Identification of Taxa: Concepts and Applications," In: Automated Taxon Identification Systematics: Theory, Approaches and Applications, McLeod (Ed.), CRC Press, Boca Raton, Florida, pp. 83-100, Jul. 23, 2007.

Eisenberg, "Digital Field Guides Eliminate the Guesswork," The New York Times, May 10, 2009, 2 pages.

El-Helly et al., "Integrating Diagnostic Expert System with Image Processing via Loosely Coupled Technique," INFOS2004, The 2nd International Conference on Informatics and Systems, Cairo, Egypt, Mar. 6-8, 2004, 15 pages.

Fleurat-Lessard et al., "Acoustic Detection and Automatic Identification of Insect Stages Activity in Grain Bulks by Noise Spectra Processing Through Classification Algorithms," 9th International Working Conference on Stored Product Protection, Sao Paulo, Brazil, Oct. 15-18, 2006, 11 pages.

Garcia, "Eavesdropping on Insects in Soil and Plants," U.S. Department of Agriculture, Agricultural Research Service, Jan. 5, 2001, (last modified Jul. 10, 2012), 1 page.

Griepentrog et al., "Autonomous Systems for Plant Protection," In: Precision Crop Protection—The Challenge and Use of Heterogeneity, Oerke et al. (Eds.), Springer Netherlands, New York, New York, pp. 323-333, Aug. 2010.

Muselli et al., "Dew Water Collector for Potable Water in Ajaccio (Corsica Island, France)," Atmospheric Research, 64:297-312, 2002.

Pande et al., "mKRISHI: A Mobile Multimedia Agro Advisory System for Remote Rural Farmers," http://www.ics.uci.edu/jain/papers/ACM_mm09_mKRISHI_non_blind.pdf, Apr. 20, 2009, 12 pages.

Pontikakos et al., "Location-Aware System for Olive Fruit Fly Spray Control," Computers and Electronics in Agriculture, 70:355-368, 2010.

Potamitis et al., "On Automatic Bioacoustic Detection of Pests: The Cases of *Rhynchophorus ferrugineus* and *Sitophilus oryzae*," Journal of Economic Entomology, 102(4):1681-1690, Aug. 2009.

Schwartz, "Engineer Uses Solar Energy, Wax, and Human Sweat to Fight Malaria," http://cleantechnica.com/2009/01/31/engineer-uses-solar-energy-wax-and-human-sweat-to-fight-malaria/, Jan. 31, 2009, 3 pages.

Sim et al., "Implementation of an XML-based Multimedia Pests Information System for USN Environment," Proceedings of the 10th ACIS International Conference on Software Engineering, Artificial Intelligences, Networking and Parallel/Distributed Computing, pp. 597-601, May 27, 2009.

Tomasini, "Insect (Adult and Larva) Detection Equipment in Stored Grain—EWD Technology," EWD Training Seminar Lite, Saint-Chamas/Carqueiranne, France, May 10-11, 2004, 8 pages.

Woodford, "Connectionist-Based Intelligent Information Systems for Image Analysis and Knowledge Engineering: Applications in Horticulture," Thesis, The University of Otago, Dunedin, New Zealand, pp. 1-9, Dec. 11, 2003.

"Google Goggles," YouTube, www.youtube.com/watch?v=Hh, accessed Jul. 19, 2010, 2 pages.

European Search Report regarding European Application No. 11176681.2, dated Jun. 6, 2012, 8 pages.

European Search Report regarding European Application No. 11176689.5, dated Jun. 14, 2012, 10 pages.

European Search Report regarding European Application No. 11176697.8, dated Dec. 22, 2011, 7 pages.

* cited by examiner

SYSTEM AND METHOD FOR IRRIGATION USING ATMOSPHERIC WATER

CROSS REFERENCE TO RELATED APPLICATIONS

This application is related to commonly assigned and co-pending U.S. patent application Ser. No. 12/427,043 entitled "System and Method for Managing Resource Use"; U.S. patent application Ser. No. 12/427,059 entitled "Horticultural Knowledge Base for Managing Yards and Gardens"; U.S. patent application Ser. No. 12/427,076 entitled "Resource Use Management"; U.S. patent application Ser. No. 12/427,065 entitled "Robotic Watering Unit" all of which are hereby incorporated by reference.

FIELD OF THE INVENTION

The invention disclosed and claimed herein relates generally to irrigating or supplying water to plants, wherein the water is obtained by condensing water vapor from air in the atmosphere. More particularly, the invention pertains to a system and method of the above type, wherein both the irrigation and water condensing activities take place at predetermined optimum time intervals.

BACKGROUND OF THE INVENTION

The growing consumption of water by human communities and agricultural activities requires the development of new sources of fresh water. One largely untapped source of fresh water is the water which exists in the air, in the form of water vapor. This water can be condensed from the air by bringing the temperature of a solid surface below the current dew point temperature, that is, the temperature at which humidity reaches 100 percent and the air is saturated with water vapor.

A number of businesses are currently providing systems to condense water out of the air, for both drinking and irrigation. These include, as examples, Element Four Technologies Inc. and Air Water International Corporation. In an exemplary system, air is forced through a condensing tube by means of a fan. In a conventional arrangement, the tube could be surrounded by refrigeration coils. The system may be activated to collect water when sub-dewpoint temperatures can be efficiently achieved, which typically occurs in the morning just before sunrise.

Notwithstanding the merits of prior art systems of the above type, such systems tend to be deficient in certain respects, especially when used for plant irrigation. For example, in scheduling the operation of a prior art condensing system to produce water for specified plants, the scheduling process typically does not take into account the energy efficiency of the condensation system, or the fact that a given plant can have different needs for water at different times, at different stages of plant growth. The scheduling process may also disregard the availability of water that was condensed previously and placed in storage, nor does it consider current soil moisture, or the use of forecasts that pertain to weather or plant evapotranspiration. Moreover, prior art systems typically do not make efficient use of available energy, and may fail to consider battery charge level, or the availability of battery recharging energy, in scheduling water condensation operations.

As a result of these shortcomings, efficiency in the operation of prior art condensation systems for plant irrigation can be significantly diminished.

SUMMARY

Embodiments of the invention provide a system and method for condensing water out of atmospheric air which is suitable for horticulture and high value crops. These embodiments significantly improve efficiency in producing water from water vapor, by carrying out condensing operations in view of particular plant water needs, and also in view of anticipated water availability. Embodiments can be used with high value individual plants or local clusters of plants, such as winegrapes, stonefruit or almonds, and can also be used with irrigation robots and passive or smart drip irrigation systems, as discussed hereinafter. However, the invention is not limited thereto.

One embodiment of the invention is directed to a method for delivering water to one or more plants of a specified type, wherein each plant resides at least partially in a quantity of soil, and is proximate to air that contains water vapor. The method comprises operating a condensing unit at optimum intervals, to condense amounts of water vapor into liquid form. The method further comprises storing the condensed water in a reservoir, wherein the reservoir is connected to an irrigation system configured to selectively deliver water from the reservoir to each of the plants. The method establishes a database that contains horticultural information, wherein the horticultural information comprises a set of values that represent the amount of water needed by a plant of the specified type at different stages of plant growth. The method also includes generating one or more estimates of the moisture content of the quantity of soil during a first specified time period. One or more optimum watering intervals are computed during the first specified time period, wherein each optimum watering interval is computed, at least in part, as a function of the set of values contained in the horticultural database, and also as a function of the estimates of moisture content. The irrigation system is operated to deliver water to each of the plants during each of the optimum watering intervals.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

DESCRIPTION OF THE PREFERRED EMBODIMENT

Figure 1:
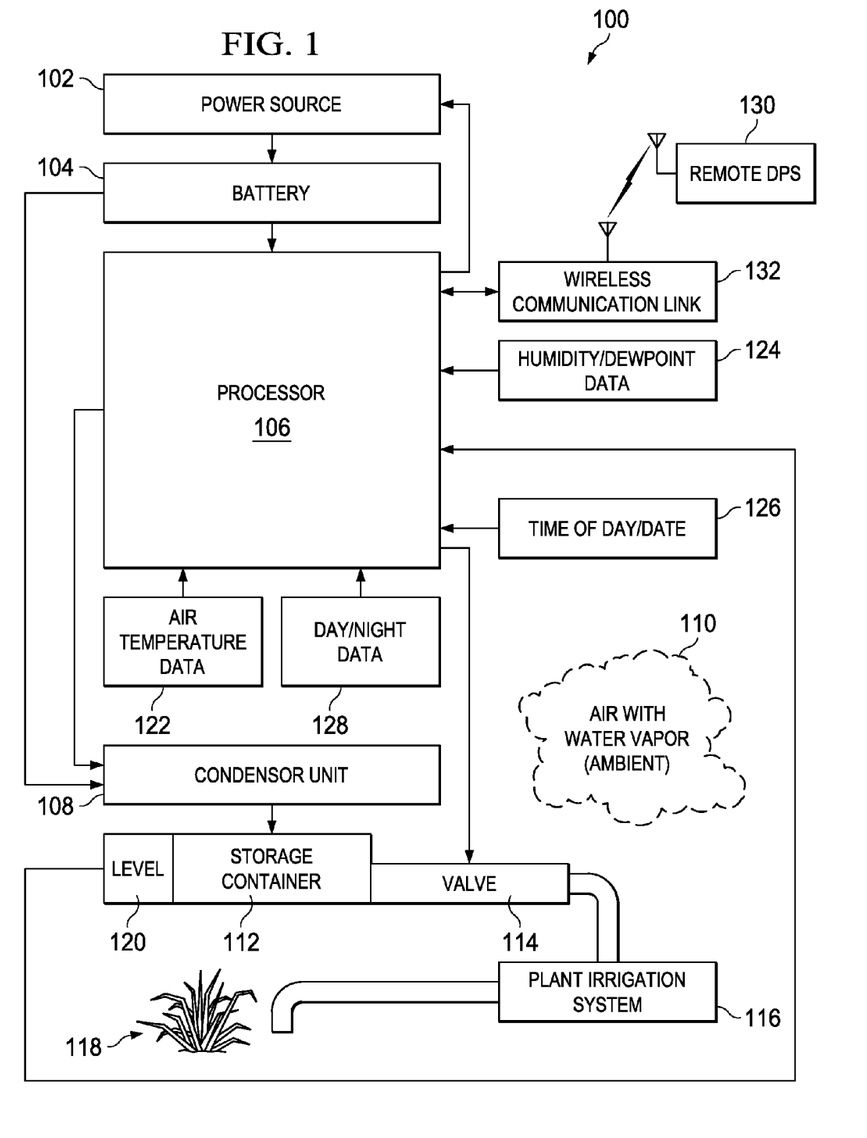
FIG. 1 is a block diagram illustrating components of a system that can be used to implement embodiments of the invention.

Referring to FIG. 1, there is shown a block diagram depicting a system 100 that may be used in implementing embodiments of the invention. System 100 includes a power source 102, which is connected to periodically supply energy to a rechargeable storage battery 104. Battery 104 is thus able to furnish power as needed to both a processor 106 and a water condenser unit 108 of system 100. It is to be understood that power source 102 could comprise a conventional power source, such as an electric power grid, or an electric generator driven by a gasoline powered engine or the like. However, in a useful embodiment, power source 102 could comprise a source of Locally Harvested Energy, such as a solar energy collector, or an electric generator driven by a windmill or other wind energy source. FIG. 1 also shows processor 106 connected to selectively control operation of power source 102.

Referring further to FIG. 1, there is shown condenser unit 108 connected to receive control signals from processor 106. Thus, processor 106 controls the operation of condenser unit 108, by selectively turning the condenser unit on or off. Condenser unit 108 is in contact with ambient atmospheric air 110, which contains water vapor. Accordingly, when the condenser unit is turned on, it operates to condense water vapor in the air to produce water in liquid form. The condensed water is then routed into a storage container or reservoir 112.

In embodiments of the invention, condenser unit 108 may comprise one of a number of currently available mechanisms or components for converting water vapor into water in liquid form, using a condensation process. Condenser unit 108 may also comprise a condensation device that includes components as described hereinafter, in connection with FIG. 4 or FIG. 5.

FIG. 1 shows storage container 112 provided with a valve 114, which is selectively opened and closed by processor 106. When valve 114 is opened, condensed water from container 112 flows through valve 114 to a plant irrigation system 116, which delivers or distributes the water to a plant or group of plants 118. Thus, processor 106 controls the amounts of water that are delivered or applied to plants 118, and also controls the times of water delivery. Plant irrigation system 116 may usefully comprise a robot water delivery system, as described in U.S. patent application Ser. No. 12/427,403, referenced above, or may comprise a passive or smart drip irrigation system, as described in U.S. Pat. No. 7,469,707. However, the invention is not limited thereto.

FIG. 1 further shows container 112 provided with a level or capacity gauge 120, which indicates the amount of water in container 112 at any given time. This amount is coupled from level 120 to processor 106, for use by the processor in controlling both the condenser unit 108 and irrigation system 116. For example, if level 120 indicated that storage container 112 was filled to maximum capacity, it would not be desirable to operate the condenser unit until such capacity was reduced. On the other hand, if container 112 was shown to be empty or at very low capacity, irrigation system 116 could not be operated, until condenser unit 108 was activated to at least partially fill the container.

In the operation of condenser unit 108, it has been recognized that production of water by the condensation process thereof is most efficient when the dewpoint and temperature of atmospheric air 110 are close together. Accordingly, processor 106 is furnished with air temperature data 122 and dewpoint or humidity data 124. By using these parameters, together with conventionally known formulas or relationships, processor 106 can compute or provide estimates of time intervals when the operation of condenser 108 to produce water will be optimum, or most efficient.

Moreover, as discussed hereinafter in further detail, the amount of water needed by plants 118 at different times is dependent on the moisture content of the soil surrounding plants 118. This, in turn, can depend on the time of day, the length of daylight and therefore the time of year, and whether it is day or night. Thus, FIG. 1 shows processor 106 being additionally provided with data 126, which indicates the time of day and the date, and with data 128, which indicates whether it is night or day.

As an alternative to processor 106 being used to perform the above and other computations, such computations and related processing activity could be carried out by a remotely located computer or data processing system 130. Processor 106 would then only need to perform the control functions described above. FIG. 1 shows processor 106 and remote data processing system 130 connected by means of a wireless communication link 132. Data processing system 130 could comprise a single processor or multiple processors.

As described above, processor 106 is provided in system 100 to control the operations of power source 102 and condenser unit 108, and to control plant irrigation system 116 by controlling valve 114. In accordance with embodiments of the invention, it has been recognized that efficiencies in using system 100 can be significantly enhanced, by generating a Water Condensation and Use Plan. The Water Condensation and Use Plan provides a set of rules that coordinate operation of the respective components of system 100 that are controlled by processor 106. The Plan also establishes optimum time intervals for performing at least some of these operations.

Figure 2:
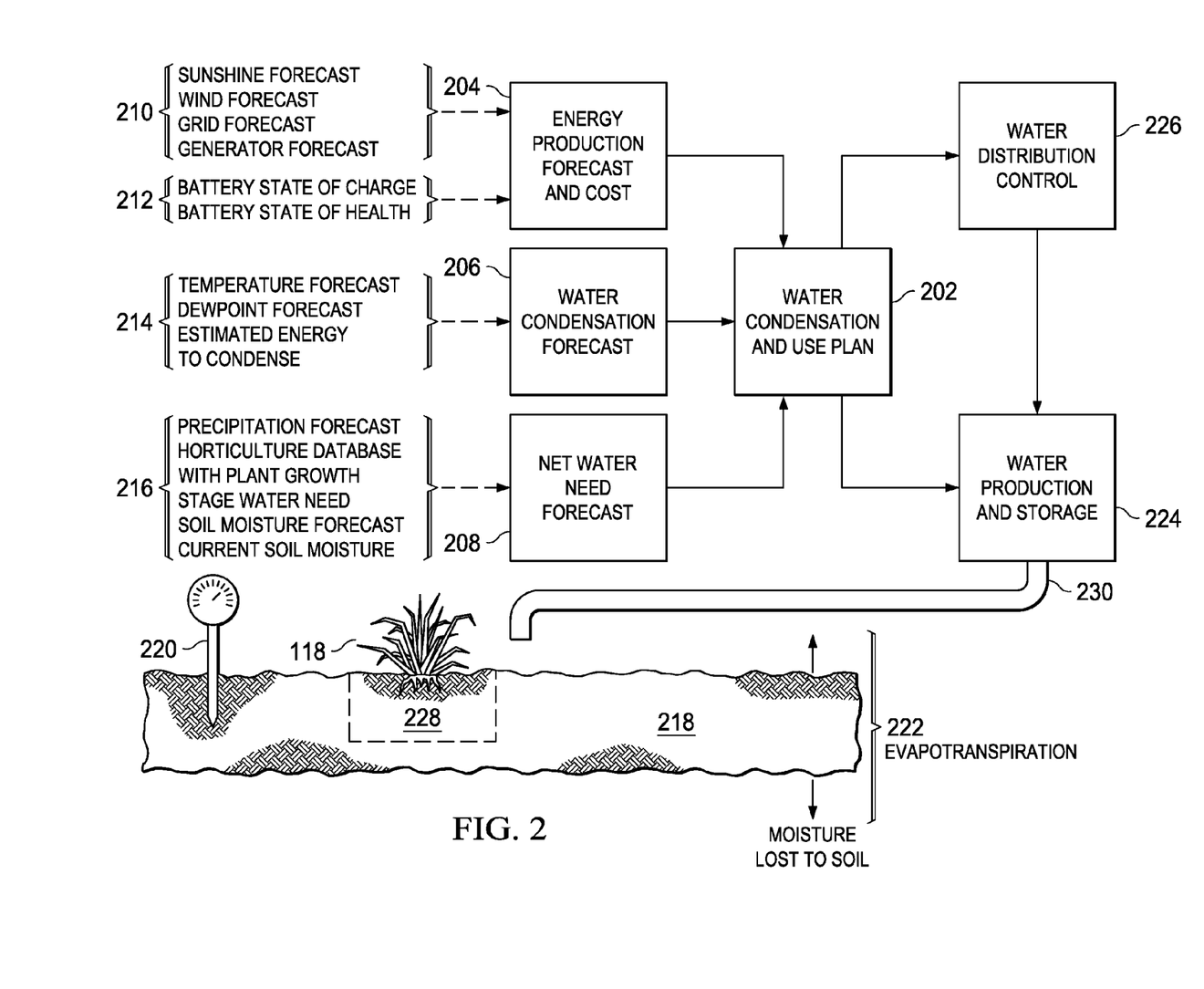
FIG. 2 is a schematic diagram illustrating construction of a Water Condensation and Use Plan, in accordance with embodiments of the invention.

Referring to FIG. 2, there is shown a Water Condensation and Use Plan 202 that is derived from three components, comprising an Energy Production Forecast and Cost component 204, a Water Condensation Forecast component 206, and a Net Water Need Forecast 208. Component 204 is an estimate of the availability and cost of energy needed to operate the system 100, and is related to power source 102 and battery 104. Component 206 pertains to forecasting or estimating times or time intervals at which condenser unit 108 can be operated, in order to achieve optimum efficiency. Component 208 provides an estimate of the water needed by plants 118 at different times or time intervals, and is thus related to operation of valve 114 and plant irrigation system 116.

The Energy Production Forecast and Cost component 204 is determined from information provided by parameter sets 210 and 212. Respective parameters of set 210 provide estimates in regard to the cost and availability of different energy sources that may be used for power source 102. More particularly, the forecasts respectively pertain to different energy sources which could alternatively be used, if available. Thus, the sunshine forecast pertains to use of solar energy and the wind forecast pertains to use of wind energy. The grid forecast indicates the availability of electric power from an electric power grid.

In parameter set 212, the battery state of charge indicates how much electrical energy is stored locally. The battery state of health indicates the maximum amount of possible charge, in view of aging and other battery degradation.

As previously discussed, the condensation process is most efficient when the temperature of air containing water vapor, and the dewpoint of the air, are close together. As is known, dewpoint is a measure of humidity, and more particularly is the temperature to which a given parcel of air must be cooled, at constant barometric pressure, for water vapor to condense into air. Accordingly, FIG. 2 shows that the Water Condensation Forecast component 206 is derived or computed from a set of parameters 214 that includes a forecast of temperature and a forecast of dewpoint, for a specified period of time. Such information may be readily acquired, for example, from hourly weather forecasts provided by the National Oceanic and Atmospheric Administration (NOAA).

Figure 3:
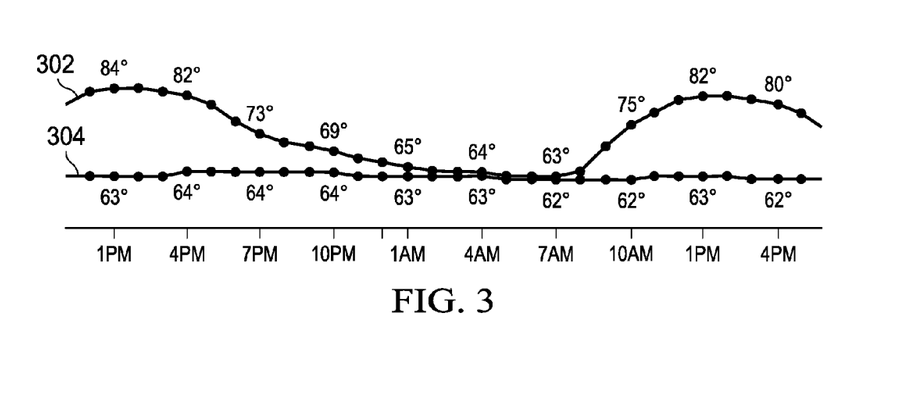
FIG. 3 illustrates a portion of a graph that shows temperature and dewpoint data over time, for use in implementing embodiments of the invention.

Referring to FIG. 3, there is shown an illustration of the above information provided by the NOAA over a 24 hour period, for a particular location. Curve 302 is a plot of temperature at hourly intervals, over a 24 hour period, and curve 304 is a plot of dewpoint at hourly intervals over the same period. FIG. 3 shows that respective values of the two curves are closest to each other between 1 a.m. and 7 a.m. Accordingly, this would be the most efficient interval to operate condenser unit 108 to produce irrigation water, in regard to the temperature and dewpoint parameters.

Referring again to FIG. 2, it is seen that the set of parameters 214, for computing water condensation forecast 206, further includes a parameter comprising the estimated energy to condense. This parameter is generally related to the energy efficiency of the condensing technology used in constructing condenser unit 108, for a given temperature. The energy efficiency of some of such technologies may be dependent on ambient air, or on ambient wind.

Referring further to FIG. 2, there is shown a set of parameters 216, for deriving Net Water Need Forecast 208. These parameters include a precipitation forecast, which may be obtained from an NOAA forecast for a given place and time period. Parameters further include a horticultural database, which specifies the amount of water needed at each state of plant growth, for each type of plant 118. An example of one horticultural database for a specified type of plant is as follows:

| Growth Stage | Minimum | Optimum |
| --- | --- | --- |
| pre flowering | 100 ml | 200 ml |
| flowering | 50 ml | 50 ml |
| past flowering | 75 ml | 150 ml |

Parameters 216 also include a soil moisture forecast and the current soil moisture, for a body of soil 218 shown in FIG. 2, in which a plant or plants 118 are growing or embedded. The value for the soil moisture parameter can be provided by a conventional soil moisture measuring gauge 220, which is inserted into the soil body 218.

The soil moisture forecast may be derived from a simple concept such as "sand drains faster than clay". Alternatively, the soil moisture forecast can be derived by means of a comparatively complex soil moisture model, such as a model which uses evapotranspiration to estimate irrigation needs. As is known, evapotranspiration describes the sum of evaporation and plant transpiration, from the surface of the earth to the atmosphere. Thus, the evapotranspiration 222 associated with a plant or plants embedded in soil will be closely related to the soil moisture content. Moreover, evapotranspiration is affected by weather conditions, such as sun, wind and dewpoint, as well as by the length of day or amount of daylight. Accordingly, the parameters 126 and 128, which respectively indicate the time and date and whether it is day or night, and which are provided to processor 106 as described above, are very pertinent to evapotranspiration and to estimating or forecasting the soil moisture content.

In one embodiment of the invention, information of the above type pertaining to evapotranspiration and soil moisture content could be collected over time. This information could then be used with a conventional machine learning algorithm to develop a soil moisture forecasting model, for the set of parameters 216 of FIG. 2.

FIG. 2 further shows that after Water Condensation and Use Plan 202 has been generated from components 204, 206 and 208, as described above, the Plan 202 provides a set of rules or principles, which are used to control two important tasks or functions. These functions comprise Water Production and Storage 224 and Water Distribution Control 226, which are both required for the operation of a system such as system 100. Function 224 pertains to rules for operating condensation unit 108 to produce water for irrigation, and for then storing the produced water. Function 226 pertains to rules for operating plant irrigation system 116 to deliver irrigation water to plants 118. As an example, some of the rules provided by Water Condensation and Use Plan 202 could be as follows:

1. If water storage is full, and if natural precipitation is adequate for the forecast period, then do not produce more water, and do not release water.
2. If water storage is not full, and if water production cost meets specified constraints, then produce water at optimum times.
3. Optimum times for producing more water are identified by:
   a) Calculating the energy and/or cost to condense a given volume of water by hourly time periods.
   b) Sorting the hourly time periods from best to worst by energy and/or cost criteria.
   c) Starting with the lowest energy and/or cost hourly time period, select in order those time periods needed to maintain water storage at a prespecified target level for forecasted production and use.
4. If water storage is full or above a specified threshold, and if plants need water, then release water to plants at optimum times.
5. Optimum times for releasing water are identified from information provided by Net Water Need Forecast 208, taken together with the ability of the soil to hold water in the plant root zone 228. By releasing water into the plant root zone for storage, the system can restore storage levels as the plant uses water from the soil.

FIG. 2 shows a conduit or pipe 230 associated with Water Production and Storage function 224 for applying water to plants 118. Conduit 230 could, for example, comprise an element of the plant irrigation system 116.

A computation to automatically derive Water Condensation and Use Plan 202, from components 204, 206 and 208, could be performed by processor 106 shown in FIG. 1. Alternatively, this operation could be performed at a remote location, such as at a back office or the like. In this arrangement, data is sent from the system 100 to the back office, and activity schedules are received from the back office, via the wireless communication link 132 of system 100. Thus, a networked irrigation system can be realized.

The wireless communication link 132 and processor 106 can also be used with an off-board computer such as a PC, laptop, PDA or cell phone (not shown) to implement a theft deterrence system. For example, if a special code is not received from the off-board computer to the system by a certain deadline, the system becomes inactive. If the unit has been stolen, its resale value or offsite usability is severely limited, since the unit cannot be used away from its official worksite.

An alternative Water Condensation and Use Plan, similar to Plan 202, could be used to manage the production and distribution of condensed water with surface or well water that has a high salt concentration. Condensed water could be mixed with the saltier water, to reduce the salt content of such water when it is applied to plants. The condensed water could also be used to flush accumulated salt out of the plant root zone following irrigation by salty water. In these scenarios, the condensation would likely be accumulated in larger amounts over a longer period of time, to be used when needed.

Figure 4:
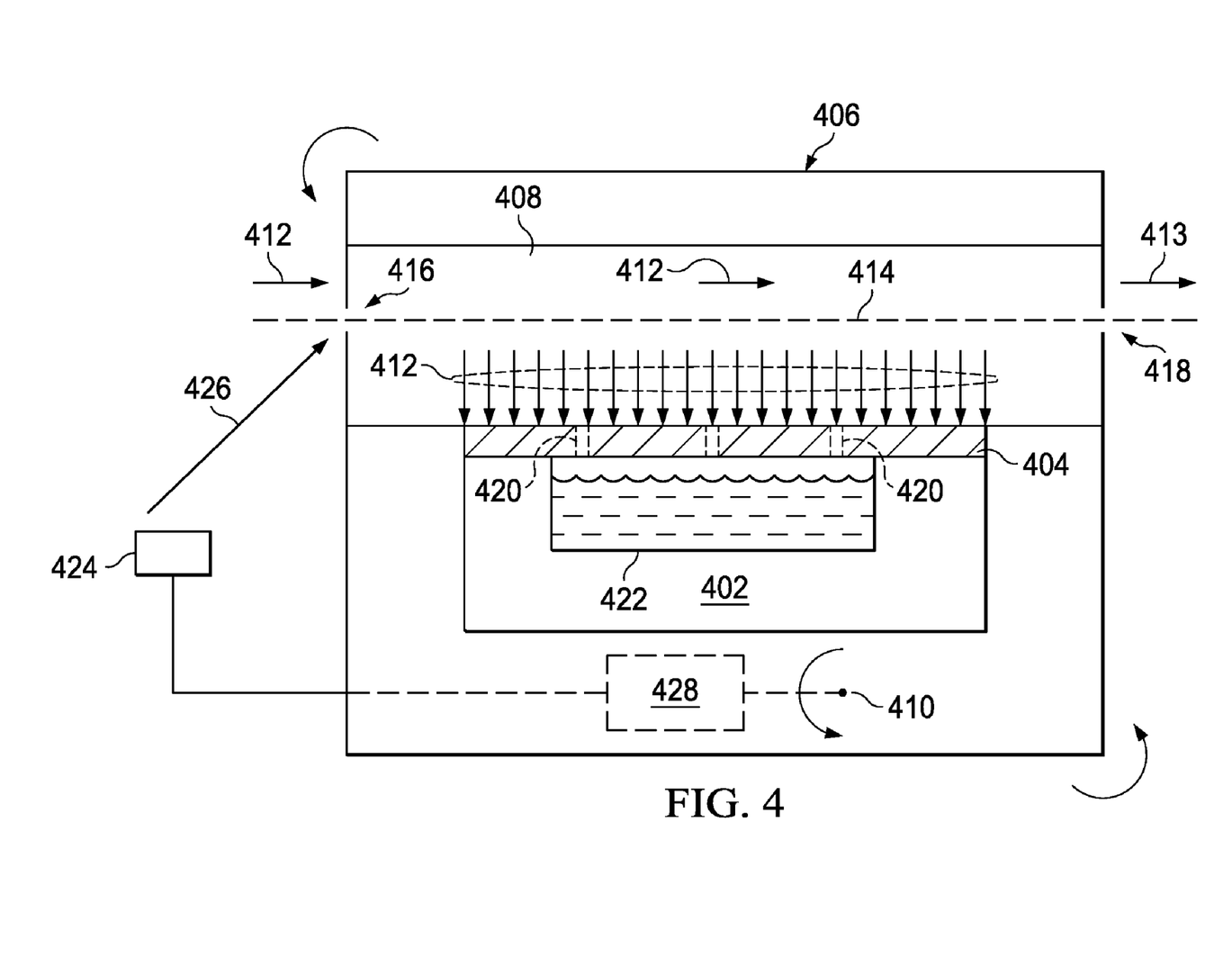
FIG. 4 is a schematic diagram showing a condenser unit component for a further embodiment of the invention.

Referring to FIG. 4, there is shown a condenser 402 that may be used for the condensation unit 108 of system 100. Condenser 402 comprises a device that condenses water vapor into liquid form by using a conventional process, and is provided with a cooling or condensing element 404, which is cooled or reduced in temperature by some means (not shown). Condenser 402 is contained in a structure 406 that has a chamber or air flow passage 408, and is mounted to rotate about a pivot point 410. When condenser 402 is to be operated to condense water vapor, relatively warm ambient air 412 containing water vapor is caused to flow through chamber 408 along an axis 414, from an entry port 416 of chamber 408 toward an exit port 418 thereof.

FIG. 4 shows that some of the moist air 412 contacts the surface of cooling element 404. This causes water vapor in the air to be condensed into water droplets. The condensed water flows through conduits 420 or the like formed in cooling element 404, into a reservoir or storage container 422. As water condenses on the surface of cooling element 404, drier air 413 exits at exit port 418. The exiting of the cooler, drier air allows moister air to enter entry port 416, and the condensation process continues with the new air.

In an embodiment of the invention, it has been recognized that efficiency of the condenser 402 can be significantly improved, by enhancing the flow of air through chamber 408. To achieve this, structure 406 and condenser 402 are located out of doors or outside. Then, when a wind is available, the wind is used to provide the required air movement through chamber 408. A sensor 424 is provided to determine the direction of the wind, which is shown in FIG. 4 by the direction of arrow 426. The wind direction is furnished to a mechanism 428 associated with structure 406. Mechanism 428 comprises a stepper motor or other conventional means for selectively rotating structure 406, in order to align axis 414 of chamber 408 with wind direction 426. This orientation enables the wind to be used most effectively, to move air through chamber 408 to condense water. By using natural wind for this purpose, it is not necessary to expend energy to operate a fan or other mechanical device, in order to move air through chamber 408.

Figure 5:
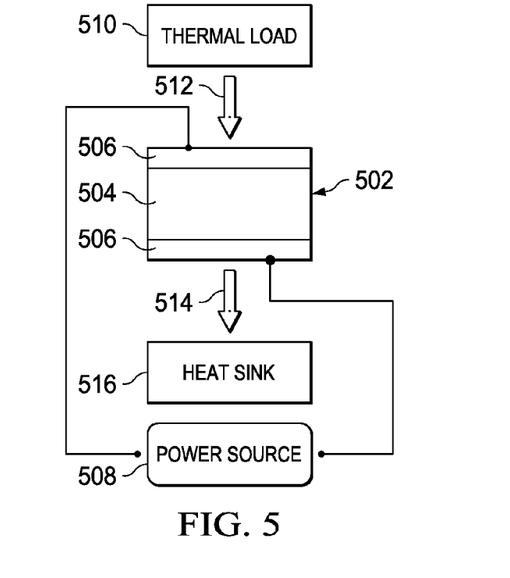
FIG. 5 is a schematic diagram showing a condenser unit component for an embodiment of the invention that uses an electrocaloric device.

FIG. 5 shows an electrocaloric device 502 that may be used in condenser unit 108, in an embodiment of the invention. Device 502 comprises an electrocaloric material 504 that is positioned between two capacitor plate electrodes 506, as a dielectric therebetween. Capacitor plates 506 are connected to a power source 508, which may comprise battery 104 of system 100. As is known, the temperature of electrocaloric material 504 increases when a voltage is applied thereto, and the temperature decreases when the voltage is removed. Accordingly, electrocaloric device 502 could provide cooling for a thermal load 510. Load 510 could, for example, comprise a surface in contact with air and water vapor 110, wherein the surface must be cooled sufficiently to cause the water vapor to be condensed into liquid form.

Referring further to FIG. 5, there is shown heat exchange mechanism 512 for transferring heat from thermal load 510 to electrocaloric device 502. There is also shown heat exchange mechanism 514, for transferring heat from device 502 to a heat sink 516. The heat exchange mechanisms could comprise either solid or fluid components, or a combination thereof.

The electrocaloric material 504 could be formed, for example, from ceramic oxide of Pb, Mg, Nb, Sc, Sr and Ti. Conventional electrocaloric devices are disclosed, for example, by U.S. Pat. Nos. 6,877,325 and 4,757,688.

Figure 6:
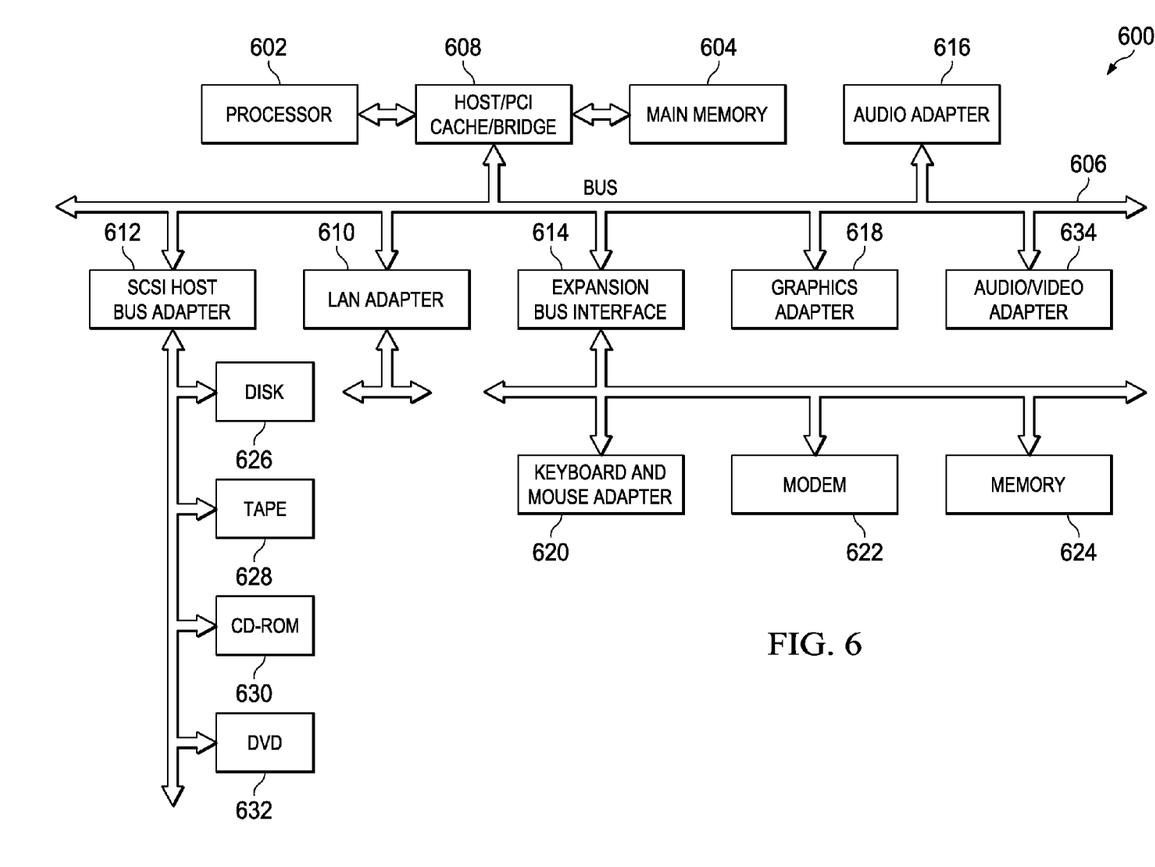
FIG. 6 is a block diagram showing a computer or data processing system for embodiments of the invention.

Referring to FIG. 6, there is shown a block diagram of a computer or data processing system 600 in which aspects of the present invention may be implemented. For example, data processing system 600 may be used as processor 106 or data processing system 130 in FIG. 1. System 600 employs a peripheral component interconnect (PCI) local bus architecture, although other bus architectures, such as Micro Channel and ISA, may alternatively be used.

Processor 602 and main memory 604 are connected to PCI local bus 606 through PCI bridge 608. PCI bridge 608 may also include an integrated memory controller and cache memory for processor 602. Additional connections to PCI local bus 606 may be made through direct component interconnection or through add-in boards. In the depicted example, local area network (LAN) adapter 610, SCSI host bus adapter 612, and expansion bus interface 614 are connected to PCI local bus 606 by direct component connection. Audio adapter 616, graphics adapter 618, and audio/video adapter (A/V) 634 are connected to PCI local bus 606 by add-in boards inserted into expansion slots. Expansion bus interface 614 provides a connection for a keyboard and mouse adapter 620, modem 622, and additional memory 624.

In the depicted example, SCSI host bus adapter 612 provides a connection for hard disk drive 626, tape drive 628, CD-ROM drive 630, and digital video disc read only memory drive (DVD-ROM) 632. Typical PCI local bus implementations will support three or four PCI expansion slots or add-in connectors.

An operating system runs on processor 602 and is used to coordinate and provide control of various components within system 600 of FIG. 6. The operating system may be a commercially available operating system, such as OS/2, which is available from International Business Machines Corporation.

Those of ordinary skill in the art will appreciate that the hardware in FIG. 6 may vary depending on the implementation. The depicted example is not meant to imply architectural limitations with respect to the present invention. For example, the processes of the present invention may be applied to multiprocessor data processing systems.

The description of the different advantageous embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A method for delivering water to one or more plants wherein each plant resides at least partially in a quantity of soil, and is proximate to air that contains water vapor, said method comprising the steps of:
    operating a condensing unit at condensing intervals to convert amounts of the water vapor into water in liquid form;
    storing said water in liquid form in a reservoir, wherein the reservoir is connected to an irrigation system configured to selectively deliver water from the reservoir to each of the plants;
    accessing a database of horticultural information for an amount of water needed by a plant type of the one or more plants;
    generating one or more estimates of the moisture content of said quantity of soil, during a first specified time period;
    computing one or more watering intervals during the first specified time period, wherein each watering interval is computed, at least in part, as a function of values contained in the horticultural database, and also as a function of the estimates of moisture content;
    gathering data pertaining to said plant water need, wherein said gathered data is used to determine at given times whether it is necessary to operate the condensing unit; and
    operating the irrigation system to deliver water to each of the plants during each of the watering intervals.

2. The method of claim 1, wherein the step of gathering data further comprises:
    gathering additional data pertaining to said soil moisture content and forecasted air temperature and dewpoint data, wherein said additional gathered data is used to determine at given times whether it is necessary to operate the condensing unit, and if not to prevent use of the condensing unit and storing of water.

3. The method of claim 1, wherein:
    air temperature data and dewpoint data is forecasted during a second specified time period, and each of the condensing intervals is computed for the second specified time period, at least in part, as a function of the forecasted air temperature data, and also as a function of the forecasted dewpoint data.

4. The method of claim 3, wherein:
    each of the condensing intervals is further computed as a function of data that indicates the energy efficiency of the condensing unit for a given air temperature.

5. The method of claim 1, wherein:
    each of the estimates of moisture is computed, at least in part, from evapotranspiration data associated with the plants of said specified type, and is further computed from data provided by a moisture content detector inserted into said quantity of soil.

6. The method of claim 1, wherein:
    operation of the condensing unit and operation of the irrigation system is respectively controlled by a specified processor, wherein the processor is connected to a data processing system by means of a wireless communication link.

7. The method of claim 6, wherein:
    a plurality of energy sources are available to operate the condensing unit, the operation of each source has an associated cost, and the processor is operable to select the source that has the lowest cost to operate the condensing unit during each of the condensing intervals.

8. The method of claim 7, wherein:
    said plurality of energy sources includes at least one source of Locally Harvested Energy.

9. The method of claim 6, wherein:
    the amount of water contained in the reservoir is continually monitored, and said amount is repeatedly furnished to the processor.

10. The method of claim 1, wherein:
    the condensing unit has a component which is disposed for alignment along the direction of an available wind, in order to increase operating efficiency of the condensing unit.

11. The method of claim 1, wherein:
    the condensing unit uses an electrocaloric device to condense amounts of water vapor into water in liquid form.

12. A method of irrigating, comprising:
    condensing, by a condensing unit, amounts of water from water vapor;
    operating the condensing unit for a condensing interval during a time period for a level of efficiency based on temperature data and dewpoint data forecasted for that time period, and an amount of water needed by a plant type of the plant in the soil;
    determining moisture content of soil subject to irrigation; and
    selectively storing the condensed water and distributing the condensed water to one or more plants based on the moisture content of the soil and the amount of water needed.

13. The method of claim 12, wherein:
    the condensing unit is operated in association with one of a plurality of energy sources based on a cost and availability of each of the energy sources during the time interval.

14. The method of claim 12, wherein:
    estimates of soil moisture content are computed at least from evapotranspiration data associated with plants of the plant type, and from data provided by a forecast of precipitation for the time period.

15. The method of claim 14, wherein:
    each of the estimates of soil moisture content is further computed from data provided by a moisture detector inserted into the soil.

16. The method of claim 12, wherein:
    the condensing interval is computed as a function of data that indicates the energy efficiency of the condensing unit for a given air temperature.

17. The method of claim 13, wherein:
    one of the plurality of energy sources is selected by processing information pertaining to at least the cost and availability of wind, of sun, and of electric power from a power grid, respectively.

18. The method of claim 17, wherein:
    the selected energy source is a storage battery, and the state of charge and the condition of the storage battery are used in selecting the storage battery.

19. Apparatus for delivering water to one or more plants wherein each plant resides at least partially in a quantity of soil, and is proximate to atmospheric air that contains water vapor, said apparatus comprising:
    a condensing unit which is operable at condensing intervals to convert amounts of the water vapor into water in liquid form;
    a reservoir for selectively storing said water in liquid form;
    a processing means associated with a database that contains horticultural information for an amount of water needed by a plant type of the one or more plants, wherein the processing means receives one or more estimates of the moisture content of said quantity of soil, during a specified first period of time, computes one or more watering intervals during the specified first period of time, each watering interval being computed, at least in part, as a function of values contained in said horticulture database, and also as a function of said estimates of moisture content, and gathers data pertaining to said plant water need, wherein said gathered data is used to determine at given times whether it is necessary to operate the condensing unit; and an irrigation system operated by said processing means to deliver water to each of the plants during each of the watering intervals.

20. The apparatus of claim 19, wherein;

the processing means receives forecasts of air temperature data and dewpoint data for a second specified time period, and each of the condensing intervals is computed for the second specified time period by the processing means, at least in part, as a function of the forecasted air temperature data, and also as a function of the forecasted dewpoint data.

21. The apparatus of claim 19, wherein:

the processing means comprises a specified processor, a data processing system and a wireless communication link, wherein the processor respectively controls operation of the condensing unit and of the irrigation system, and the processor is connected to the data processing system by means of the wireless communication link.

* * * * *